United States Patent [19]
Egger

[11] 3,782,299
[45] Jan. 1, 1974

[54] METHOD FOR RENDERING REFUSE DEPOSITS, INDUSTRIAL WASTE AND THE LIKE, HARMLESS

[76] Inventor: Hans Egger, 811 Hagen b. Murnau, Haus Nr. 44, Hagen, Germany

[22] Filed: May 11, 1972

[21] Appl. No.: 252,223

[30] Foreign Application Priority Data
May 14, 1971 Germany.................. P 21 24 018.6

[52] U.S. Cl. ................................ 110/7 R, 110/8 C
[51] Int. Cl. ............................................. F23g 5/00
[58] Field of Search .................... 110/7 R, 8 R, 8 C, 110/18 R, 18 C; 252/382

[56] References Cited
UNITED STATES PATENTS

| | | | |
|---|---|---|---|
| 1,985,491 | 12/1934 | Fisher | 252/382 |
| 2,375,868 | 5/1945 | Noble | 252/382 |
| 3,518,952 | 7/1970 | Francisovich | 110/8 |
| 3,524,417 | 8/1970 | Stone | 110/8 |
| 3,610,180 | 10/1971 | Scott et al. | 110/18 |

FOREIGN PATENTS OR APPLICATIONS

| | | | |
|---|---|---|---|
| 1,035,573 | 7/1958 | Germany | 252/382 |

*Primary Examiner*—Kenneth W. Sprague
*Attorney*—Lorimer P. Brooks et al.

[57] ABSTRACT

Refuse deposits and industrial wastes are rendered harmless by at least partially encasing them in a foam material. The refuse deposits and industrial wastes may also be permeated with the foam material. After encasement the coated deposits may be burnt.

7 Claims, No Drawings

METHOD FOR RENDERING REFUSE DEPOSITS, INDUSTRIAL WASTE AND THE LIKE, HARMLESS

The invention relates to a method for rendering refuse deposits, industrial waste and the like, harmless.

In recent times great emphasis has been laid upon the need for adequate protection of the environment, since it has been recognized that the increasing contamination of the air and of water-courses constitutes a serious danger to mankind.

Part of this contamination is caused by waste materials from communities, towns and industry, which materials when deposited not only release harmful substances into the air, but also pass into the underground water as a result of the action of rain, for example, and as a consequence of other atmospheric influences, so that the underground water is contaminated by such materials. When refuse and industrial waste is deposited on dumps or tips, there arises the further danger of dangerous disease germs being produced or released by the putrefaction or fermentation processes that take place, and of vermin, rodents and the like being attracted to the dumps.

For all these reasons, the present accumulations of refuse and industrial waste constitute a serious danger to the environment.

The object of the invention is to render these deposits and wastes harmless and in so doing particularly to prevent contamination of the air and of ground water by these materials.

According to the invention this object is achieved by permeating refuse deposits with a foam material and/or enclosing them at least partially in such material.

In a preferred form of the invention, the refuse deposits are enclosed by coating their surfaces with a foam material.

In a further preferred form of the invention, the refuse and other waste is deposited on a piece of ground which has been previously coated with foam material, and the surface is then coated with the foam material.

In yet another preferred form of the invention, another covering, e.g. a film or foil, is applied before coating with the foam material.

Another form of the method of the invention is characterized in that the refuse deposits or industrial wastes, coated with foam material, are burnt.

For this purpose it is expedient to introduce a medium, which gives off oxygen, into the foam material during its manufacture.

The procedure used when applying the method of the invention is as follows. The refuse deposits or industrial waste are carried to a normal refuse tip, the ground of which may optionally have been covered beforehand with a layer of foam material. Then, after the heap of refuse has grown to the intended size, the deposited materials are coated with a layer of foam material. Prior to, subsequent to or during this coating operation, the cavities in the refuse deposits can also be permeated or filled with a foam material.

Any commercial products can be used as the foam material but preference is given to those having closed pores.

The nature of the foam material used, and the thickness of its layer used as the coating can vary greatly, and can be suited to the particular conditions. Examples for suitable foams are foams made out of the polyvinylchloride, polyurethane, polystyrene and phenyl-formaldehyde-resins. A few tests can be carried out to provide guidance as to the best foam material for a particular case and to determine the optimum thickness of layer. In this connexion, the nature of the waste to be treated also plays a part. When the waste is permeated with the foam material, i.e., when the cavities in the waste are filled with the foam material, a possible procedure is to introduce the injection nozzles of the foam applying apparatus into the interior of the deposited heap and preferably at several points, the foam material then being forced in under pressure.

The coating of refuse deposits and industrial waste with foam materials as provided for by the invention results in the refuse and waste being sealed off from the atmosphere by a thick covering wich prevents on the one hand the entry of air and rain water into the deposits, and on the other the escape of harmful gases.

Particularly in that embodiment of the invention in which the ground is coated with a foam material before being covered with refuse, harmful substances are prevented from passing from the refuse deposit into the underground water as a result, for example, of the action of rain etc., and from causing contamination in the underground water.

Although the coating of refuse with foam material, as proposed by the invention, per se prevents contamination in a satisfactory manner, it is nevertheless expedient in some cases to burn away the entire refuse deposit so as to destroy the organic substances or germs contained therein, in a safe manner, and to prevent the generation of gases resulting from putrefaction within the dump.

In the method of the invention, this can be readily achieved by setting fire to the refuse deposits or industrial wastes coated with foam material. The oxygen necessary for promoting combustion can be provided by, for example, mixing suitable oxygenating agents such as potassium chlorate or salpetre in the foam material during its manufacture, or by introducing oxygen in gaseous form into the dump by inserting lances or the like.

All the organic substances in the refuse dump are destroyed by burning, and there only remain inorganic constituents, soot and the like, which no longer constitute any threat to the environment.

Finally, following the burning process, a further coating of foam material can be applied in order to cover up the ugly remains of combustion from sight. Plants can then be set in this coating of foam material in known manner, so that the abandoned refuse dump acquires an aesthetically pleasing appearance.

I claim:

1. A method of rendering refuse deposits and industrial wastes harmless, which method comprises at least partially encasing the refuse deposit or industrial waste in a foam material having closed pores, wherein said foam material is selected from the group consisting of polyvinylchloride, polyurethane, polystyrene and phenyl-formaldehyde resins.

2. A method as claimed in claim 1, wherein the refuse deposit or industrial waste is permeated with the foam material.

3. A method according to claim 1, wherein the refuse or other waste materials are deposited on a piece of ground which has been previously coated with foam material, and the surface of the refuse or waste is then coated with the foam material.

4. A method according to claim 1, wherein a further covering in the form of a foil or film, is applied before coating with the foam material.

5. A method according to claim 1, wherein the refuse deposit or industrial waste, coated with foam material, is burned away.

6. A method according to claim 5, wherein an agent that gives off oxygen is included in the foam material during its manufacture.

7. A method according to claim 1, wherein the waste is at least partially encased by depositing a coating of foam material on the surface of the waste.

* * * * *

UNITED STATES PATENT OFFICE
CERTIFICATE OF CORRECTION

HEH-001

Patent No. 3,782,299          Dated January 1, 1974

Inventor(s) HANS EGGER

It is certified that error appears in the above-identified patent and that said Letters Patent are hereby corrected as shown below:

Claims 3 and 4, line 1 of each, change "claim 1" to --claim 7--.

Signed and sealed this 9th day of April 1974.

(SEAL)
Attest:

EDWARD M. FLETCHER, JR.
Attesting Officer

C. MARSHALL DANN
Commissioner of Patents